L. WOODEN.
SET SCREW.
APPLICATION FILED DEC. 20, 1916.

1,247,356.

Patented Nov. 20, 1917.

Inventor
L. WOODEN
By  N. S. ...
Attorney

UNITED STATES PATENT OFFICE.

LYNN WOODEN, OF BLACK ROCK, OREGON.

SET-SCREW.

1,247,356. Specification of Letters Patent. Patented Nov. 20, 1917.

Application filed December 20, 1916. Serial No. 138,001.

*To all whom it may concern:*

Be it known that I, LYNN WOODEN, a citizen of the United States, residing at Black Rock, in the county of Polk, State of Oregon, have invented a new and useful Set-Screw; and I do hereby declare the following to be a full, clear, and exact description of the invention, such as will enable others skilled in the art to which it appertains to make and use the same.

The present invention relates to certain new and useful improvements in set screws, and has for its object to provide a device of this character which embodies novel features of construction whereby no amount of jars or vibration will cause the set screw to work loose after it has once been screwed into a locking position.

Further objects of the invention are to provide a set screw which is simple and inexpensive in its construction, which can be handled in the same manner as an ordinary set screw, and which has a novel construction of clamping face adapted to bite into and engage the material against which it is screwed so as to eliminate all danger of the set screw working loose under the influence of vibrations.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Corresponding and like parts are referred to in the following description and indicated in all the views of the drawing by the same reference characters.

Figure 1:
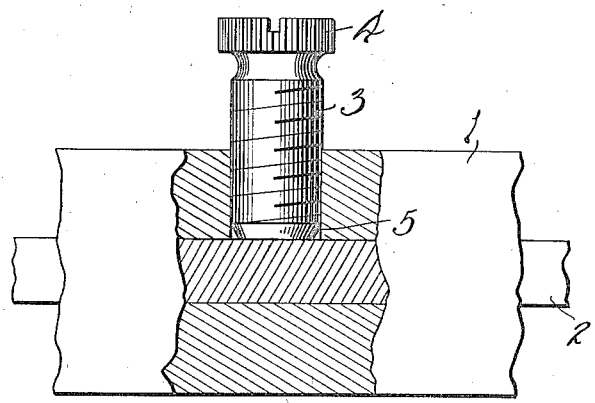
Figure 1 is a side elevation of a portion of a sleeve which has a rod slidably mounted therein and adapted to be held in an adjusted position by means of a set screw constructed in accordance with the invention, portions of the sleeve and rod being broken away and appearing in section, while the set screw appears in side elevation.
Figure 2:
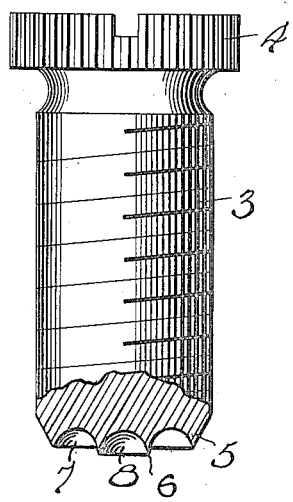
Fig. 2 is an enlarged side elevation of a set screw constructed in accordance with the invention, the lower end of the set screw appearing in section.
Figure 3:
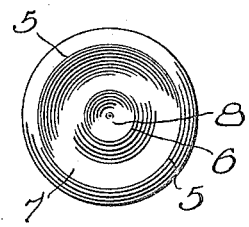
Fig. 3 is a bottom plan view of the set screw.

For the purpose of illustration the set screw is shown as threaded within a sleeve 1 and arranged for engagement with a rod 2 slidable within the sleeve to lock the rod in an adjusted position. The body portion 3 of the set screw is threaded within a suitable opening provided in the sleeve 1 and is preferably slightly larger than the threaded stem of an ordinary set screw. The outer end of the set screw is provided with an enlarged milled head 4 which is adapted to be grasped by the fingers when turning the set screw into position or removing it therefrom. The clamping face at the end of the set screw is formed with an outer annular rib 5 which is offset inwardly a slight amount from the outer walls of the set screw body, and an inner concentric annular rib 6, said ribs having sharpened jaws so as to bite into the surface against which they are screwed. The two annular ribs 5 and 6 are separated by an annular depression 7, while the inner rib 6 surrounds a central depression 8. When the set screw is turned into locking position, the ribs 5 and 6 at the extremity thereof bite into the surface against which they are screwed, the inside rib permitting an accurate adjustment, while the outside rib makes the grip stronger. For this purpose it may be preferable to construct the set screw with the inside rib 6 slightly in advance of the outside rib 5. After being once screwed into position the set screw is thus locked against backward rotation, and will not come loose even when subjected to continuous vibration.

Having thus described the invention, what I claim as new and desire to secure by Letters Patent, is:—

A set screw formed with a clamping face provided with an inner annular rib and an outer annular rib separated by an annular depression, said ribs terminating in sharp edges adapted to bite into the surface against which the screw is turned, the inner rib being arranged slightly in advance of the outer rib to admit of a fine adjustment being obtained.

In testimony whereof I have signed my name to this specification in the presence of two subscribing witnesses.

LYNN WOODEN.

Witnesses:
   DALE M. GOTTFRIED,
   W. H. BEARD.